United States Patent
Pitera et al.

(10) Patent No.: US 9,672,138 B1
(45) Date of Patent: Jun. 6, 2017

(54) ENABLING COMMUNICATION BETWEEN AN APPLICATION DEVELOPER AND AN APPLICATION TESTER

(71) Applicant: Amazon Technologies, Inc., Seattle, WA (US)

(72) Inventors: Albert Pitera, Irvine, CA (US); Spencer Lyle Voorheis, Arroyo Grande, CA (US); Calvin Yue-Ren Kuo, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/671,805

(22) Filed: Mar. 27, 2015

(51) Int. Cl.
 G06F 11/36 (2006.01)
 H04L 29/06 (2006.01)

(52) U.S. Cl.
 CPC ........ G06F 11/3664 (2013.01); H04L 65/403 (2013.01)

(58) Field of Classification Search
 CPC ........................... G06F 11/3664; H04L 65/403
 USPC ........................................................ 717/124
 See application file for complete search history.

(56) References Cited

U.S. PATENT DOCUMENTS

| 6,654,911 | B1 * | 11/2003 | Miles | G06F 11/3664 |
| | | | | 714/25 |
| 2004/0024868 | A1 * | 2/2004 | Drummond, II | H04L 12/2697 |
| | | | | 709/224 |
| 2009/0287783 | A1 * | 11/2009 | Beare | G06Q 10/00 |
| | | | | 709/206 |
| 2013/0086551 | A1 * | 4/2013 | Archer | G06F 8/34 |
| | | | | 717/113 |
| 2014/0235326 | A1 * | 8/2014 | Paracha | G06Q 10/101 |
| | | | | 463/25 |

OTHER PUBLICATIONS

Web Article: "Mayday: Get Help on your Fire Tablet", published by Amazon, 2015, [online][retrieved on: Mar. 27, 2015] retrieved from http://www.amazon.com/gp/help/customer/display.html?nodeId=201540070, 2 pps.
Web Article: "Wherever you go, GoToMyPC goes", published by Citrix, 2015, [online][retrieved on Mar. 27, 2015] retrieved from: www.gotomypc.com, 2 pps.

* cited by examiner

Primary Examiner — Viva Miller
(74) Attorney, Agent, or Firm — Lee & Hayes, PLLC

(57) ABSTRACT

Technologies are disclosed herein for enabling communication between an application developer and application testers, and for facilitating application testing. An application to be tested may be modified during ingestion by an application store to include a testing component. When the application is executed by an application tester on a computing device, the testing component provides functionality for assisting the tester with the testing of the application. As one example, the testing component might provide on-screen instructions to the application tester to perform an operation or a sequence of operations in the application that have been defined by the application developer. The testing component might also facilitate direct communication between the application developer and the application tester through screen sharing, one or two-way video chat, text chat, and/or other mechanisms.

20 Claims, 7 Drawing Sheets

ENABLING COMMUNICATION BETWEEN AN APPLICATION DEVELOPER AND AN APPLICATION TESTER

BACKGROUND

Software application stores (which are commonly referred to as "app stores") typically provide functionality for allowing customers to browse and obtain software applications for free or for a fee. For example, and without limitation, an application store might enable a customer utilizing a smartphone or tablet computing device to browse and obtain various types of applications that are suitable for use on the customer's particular type of computing device. Applications available through an application store might be provided by the operator of the application store or by third-party application developers.

In order to test software applications prior to releasing the applications in an application store, application developers commonly provide pre-release versions of software applications to application testers. The application testers might be part of the same organization or outside parties. In either case, the application testers might not be located at the same geographic location as the application developer. For example, it is not uncommon for application testers to be located in different cities, countries, or even on different continents from an application developer. In this scenario, it might be difficult for an application developer to communicate with application testers regarding the testing of an application. Consequently, the testing of an application might be performed in an inefficient manner.

The disclosure made herein is presented with respect to these and other considerations.

DETAILED DESCRIPTION

Figure 1:
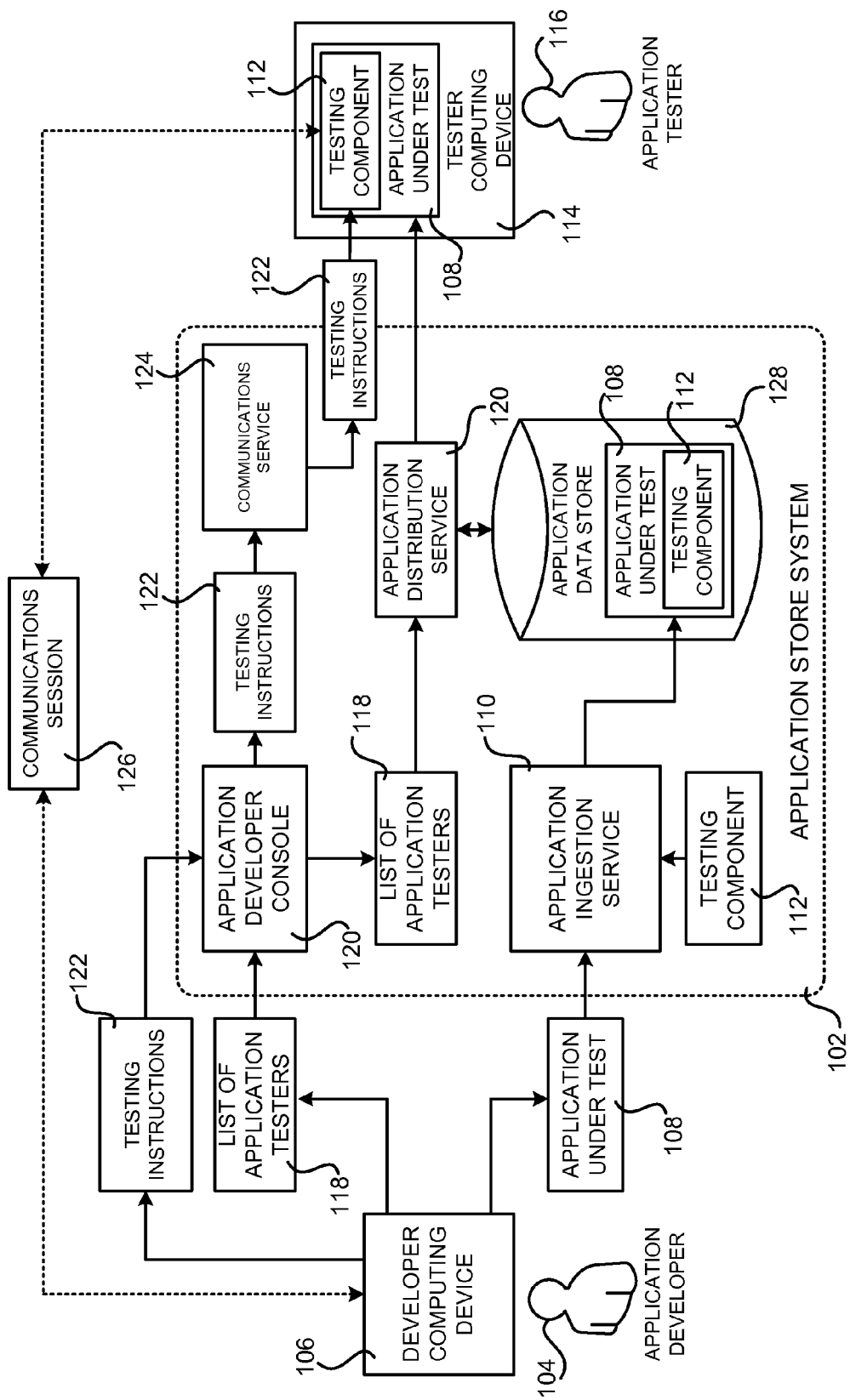
FIG. 1 is a system architecture diagram showing aspects of the configuration and operation of several components described herein for enabling communication between an application developer and an application tester, and for facilitating the testing of an application.

The following detailed description is directed to technologies for enabling communication between an application developer and an application tester, and for facilitating the testing of an application. Utilizing an implementation of the technologies described herein, an application developer can efficiently communicate with application testers regarding the testing of an application. For example, and without limitation, an application developer can utilize the technologies disclosed herein to provide push notifications, other types of on-screen messages, and/or other types of information to application testers during the execution of an application under test.

A developer might also be able to view the screen display of a tester computing device upon which an application is being tested or engage in a one or two-way audio or video chat with an application tester. Moreover, an application developer can define testing instructions that include information to be presented to application testers during testing and/or that specify a sequence of steps or operations to be performed by an application tester during the testing of an application. The testing instructions and/or the various communications mechanism disclosed herein might be utilized to more efficiently, fully, and accurately test applications than possible utilizing previous solutions.

In order to enable the functionality disclosed briefly above, an application developer may submit an application to be tested, which may be referred to herein as an "application under test" or simply an "application", to an application store system. An application ingestion service operating within the application store system receives the application under test and modifies the application under test to include a testing component. As will be described in greater detail below, the testing component includes program code for enabling communication between the application developer and an application tester. Once the application under test has been modified to include the testing component, the application under test may be stored in an application data store or another suitable storage location.

In some configurations, the application developer might also provide a list of authorized application testers to an application developer console or another component provided by the application store system. The list of authorized application testers identifies one or more application testers that are authorized to receive the application under test. In this way, the application under test may be distributed to authorized application testers but not made generally available through an application store until the application has been sufficiently tested. The list of application testers may be provided to an application distribution service. When a request for the application under test is received, the application distribution service may determine whether the request is from an authorized tester. If the request is from an authorized tester, the application distribution service may distribute the application under test to a computing device associated with the application tester (i.e. a "tester computing device").

In some configurations, the application developer may also specify testing instructions for use by the testing component executing in conjunction with the application under test on a tester computing device. The testing instructions may, for example, specify information to be presented to the application tester during execution of the application. The testing instructions might also specify when and how the information is to be presented during the execution of the application.

As a specific example, the testing instructions might specify text, graphics, audio, video, and/or other on-screen elements that are to be presented to an application tester during execution of the application under test. The testing instructions might also specify on-screen areas that are to be highlighted or otherwise emphasized in order to facilitate the testing of functionality enabled by those areas. Various types of overlays, dialog boxes, pop-up notifications, and/or other types of graphical user interface ("GUI") controls may be utilized to present the information to the application tester.

The testing instructions might also specify one or more steps or operations to be performed by the application tester. When the application tester completes one of the steps, a visual or audible prompt might be provided instructing the application tester to perform another operation. In this way, the application developer can define and implement a testing workflow to test various aspects of the operation of the application under test.

The testing component might also provide functionality for enabling communication between the application tester and the application developer in some configurations. For example, and without limitation, the testing component might be configured to establish a communications session between the tester computing device and an application developer computing device. Once the communications session has been established, screen data from the tester computing device may be transmitted to the application developer computing device. In this way, the application developer can view the same on-screen output as the application tester.

The testing component might also be configured to utilize the communications session to provide a one or two-way audio or audio/video chat session between the developer computing device and the tester computing device. A one or two-way text chat session might also be established between the developer computing device and the tester computing device. The communications session might also be utilized to enable the application developer to provide on-screen annotations on the tester computing device, to control the operation of the tester computing device, and/or to provide other types of information to the application tester for use in testing the application.

The testing component can also provide functionality for collecting feedback regarding the testing of the application from the application tester. For example, and without limitation, the application tester might provide commentary or annotations regarding the various steps of testing an application. In another configuration, the testing component captures data identifying the operations performed by the application tester during testing of the application and provides the data to the developer computing device. The data might then be utilized to perform testing on other physical or virtual computing devices. Other types of feedback might also be captured during the testing of an application and provided to a developer computing device. Additional details regarding the various components and processes described briefly above for enabling communication between an application developer and an application tester, and for facilitating the testing of an application will be presented below with regard to FIGS. 1-7.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS.").

FIG. 1 is a system architecture diagram showing aspects of the configuration and operation of several components described herein for enabling communication between an application developer and an application tester, and for facilitating the testing of an application. As shown in FIG. 1, an application store system 102 may be utilized to provide an application store (not shown in FIG. 1). As known to those skilled in the art, and discussed briefly above, application stores typically provide functionality for allowing customers to browse and obtain software applications for free or for a fee. For example, and without limitation, an application store might enable a customer utilizing a smartphone or tablet computing device to browse and obtain various types of applications that are suitable for use on the customer's particular type of computing device. An application store might, for example, offer applications for use on customer devices such as smartphones, tablet or slate computing devices, laptop or desktop computers, and/or other types of computing devices. Applications available through an application store might be provided by the operator of the application store and/or by third-party application developers.

A customer of an application store may use a customer device to access the application store through a network (not shown in FIG. 1), such as the Internet. A customer may be an individual or entity that desires to browse, purchase, or has purchased, one or more applications from the application store. The customer device may be a smartphone, personal computer ("PC"), desktop workstation, laptop computer, tablet computer, notebook computer, personal digital assistant ("PDA"), electronic-book reader, game console, set-top box, consumer electronics device, server computer, or any other type of computing device capable of connecting to a data communications network and communicating with the application store.

In some configurations, software components executing within the application store system 102 provide functionality for permitting customers to browse and purchase applications available from the application store. For instance, the application store may receive a browse request from a customer device and, in response thereto, retrieve information regarding a particular application offered for sale from the application store referenced by the browse request, generate or retrieve information describing the application, and transmit the information over a network to a client application (not shown in FIG. 1) executing on the customer device for display to the customer. The application information may include a name of the application, the name of the application developer that developed the application, a text description of the application, one or more images of the application during execution, a price for the application, and/or other information. The application information might be stored in a suitable database or other type of data store maintained by the application store system 102 for each application offered for sale.

In order to provide the application store and, potentially, the other functionality disclosed herein, the application store system 102 might include one or more application servers (also not shown in FIG. 1). The application servers may execute a number of software components in order to provide the application store. The software components may execute on a single application server or in parallel across multiple application servers. In addition, each software component may consist of a number of subcomponents executing on different application servers or other virtual or physical computing resources. Various components may be implemented as software, hardware, or any combination of the two.

The network utilized to connect to the application store to its customers might be a local-area network ("LAN"), a wide-area network ("WAN"), the Internet, or any other networking topology known in the art that connects a customer device to the application store. A customer may use a client application (not shown in FIG. 1) executing on the customer device to access and utilize the functionality provided by the application store. The client application might be a web browser or a stand-alone client application configured for communicating with the application store. The client application might also utilize any number of communication methods known in the art to communicate with the application store across a network, including remote procedure calls, network service calls, remote file access, proprietary client-server architectures, and the like.

The application store provided by the application store system 102 might also provide functionality for allowing an application developer 104 to submit an application for inclusion in the application store. For example, and without limitation, the application store system 102 may be configured to provide an application developer console 120 in some configurations. The application developer console 120 may provide a web-based interface through which an application developer 104 can create a new developer account in the application store, submit an application for inclusion in the application store, and define application metadata for the application, such as a description of the application, the price for the application, if any, and other information pertinent to the application.

Once an application developer 104 has submitted an application and associated application metadata to the application store, the operator of the application store system 102 might perform a process for approving the application for inclusion in the application store. For example, various types of automated tests might be performed on the application. If the operator of the application store approves the application for inclusion in the application store, the application will then be made available to customers. If the operator of the application store does not approve the application for inclusion in the application store, a notification might be transmitted to the application developer 104 indicating that the application was denied and providing a reason for the denial.

It should be appreciated that the application store system 102 shown in FIG. 1 has been simplified for discussion purposes and that many additional software and hardware components may be utilized. In particular, the application store computing system 102 might interoperate with many other computing systems in order to provide an application store. Other systems and/or services not shown in FIG. 1, such as billing systems, reporting systems, customer relationship management systems, and others might also be utilized.

As also discussed briefly above, in order to test software applications prior to releasing the applications in an application store, application developers commonly provide pre-release versions of their software applications to application testers, such as the application tester 116. The application testers might be part of the same organization or outside parties. In either case, the application testers 116 might not be located at the same geographic location as the application developer 104. For example, it is not uncommon for application testers 116 to be located in different cities, countries, or even on different continents than the application developer 104. In this scenario, it might be difficult for an application developer 104 to communicate with application testers 116 regarding the testing of an application. Consequently, the testing of an application might be performed in an inefficient manner.

In order to address the considerations set forth above, and potentially others, the application store system 102 is configured to enable various types of communication between an application developer 104 and an application tester 116 and, potentially, for facilitating the testing of an application 108. For example, and without limitation, utilizing an implementation of at least some of the technologies described herein, an application developer 104 can efficiently communicate with one or more application testers 116 regarding the testing of an application 108. For instance, an application developer 104 may be permitted to provide push notifications, other types of on-screen messages, and/or other types of information to application testers 116 during the execution of an application under test 108. The application tester 116 can also communicate with the application developer 104 in a similar fashion.

An application developer 104 might also be able to view the screen display of a tester computing device 114 upon which an application 108 is being tested and/or engage in a one or two-way audio or video chat with an application tester 116. Moreover, an application developer 104 can define testing instructions 122 that include information to be presented to application testers 116 during testing of an application 108 and/or that specify a sequence of steps or operations to be performed by an application tester 116 during the testing of the application 108. As discussed above, the testing instructions 122 and the various communications mechanisms enabled by the technologies disclosed herein might be utilized to more efficiently, fully, and accurately test applications 108 than possible utilizing previous solutions.

In order to enable the functionality disclosed above, an application developer 104 might submit an application 108 to be tested to the application store system 102. For instance, in one configuration an application ingestion service 110 operating within the application store system 102 receives the application under test 108 from a computing device 106 associated with the application developer 104 (i.e. the "developer computing device" 106) and modifies the application under test 108 to include a testing component 112. The developer computing device 106 might be a smartphone, PC, desktop workstation, laptop computer, tablet or slate computer, notebook computer, PDA, electronic-book reader, game console, set-top box, consumer electronics device, server computer, or any other type of computing device capable of executing applications and connecting to the application store system 102 via an appropriate communications network.

As will be described in greater detail below, the testing component 112 includes program code for enabling communication between the application developer 104 and an application tester 116. Once the application under test 108 has been modified to include the testing component 112, the application under test 108 may be stored in an application data store 128 or another suitable storage location. Additional details regarding the ingestion of the application under test 108 by the application store system 102 and the modification of the application under test 112 to include the testing component 112 will be provided below with regard to FIG. 2.

As discussed briefly above, an application developer 104 might also provide a list of application testers 118 to an application developer console 120 or another component provided by the application store system 102. The list of application testers 118 identifies one or more application testers 116 that are authorized to receive the application under test 108. In this way, the application under test 108 may be distributed to authorized application testers 116, but not made generally available through the application store provided by the application store system 102 until the application 108 has been sufficiently tested.

The list of application testers 118 is provided to an application distribution service 120 in one particular configuration. When a request for the application under test 108 is received, the application distribution service 120 may utilize the list of application testers 118 to determine whether the request is from an authorized application tester 116. If the request is from an authorized application tester 116, the application distribution service 120 will retrieve the application under test 108 that has been modified to include the testing component 112 from the application data store 128 and provide the application under test 108 to the tester computing device 114 associated with the application tester 116.

Once the application distribution service 120 has provided the application under test 108 to the tester computing device 114, the application 108 may then be executed on the tester computing device 114. The tester computing device 114 might be a smartphone, PC, desktop workstation, laptop computer, tablet or slate computer, notebook computer, PDA, electronic-book reader, game console, set-top box, consumer electronics device, server computer, or any other type of computing device capable of executing applications and connecting to the application store system 102 via an appropriate communications network. Additional details regarding one mechanism disclosed herein for distributing an application under test 108 to authorized application testers 116 is provided below with regard to FIG. 3.

In some configurations, the application developer 104 might also specify testing instructions 122 for use by the testing component 112 executing in conjunction with the application under test 108 on a tester computing device 114. As discussed briefly above, for example, the testing instructions 122 specify information to be presented to an application tester 116 by the testing component 112 during execution of the application under test 108. The testing instructions 122 might also specify when and how the testing component 122 is to provide the specified information during the execution of the application under test 108. In one configuration, a communications service 124 is utilized within the application store system 102 to distribute the testing instructions 122 to instances of the testing component 112.

The testing instructions 122 might specify text, graphics, audio, video, and/or other on-screen elements that are to be presented by the testing component 112 to an application tester 116 during execution of the application under test 108 on a tester computing device 114. The testing instructions 122 might also specify on-screen areas that are to be highlighted or otherwise emphasized in order to facilitate the testing of functionality presented within those areas. In order to provide this functionality, the testing component 112 might be configured to display an overlay containing the on-screen elements on top of a display provided by the application under test 108. The testing component might also, or alternately, be configured to present modal or non-modal dialog boxes, pop-up notifications, and/or other types of GUI controls in order to present the information defined by the testing instructions 122 to an application tester 116.

In some configurations, the testing instructions 122 also specify one or more steps or operations to be performed by the application tester 116. For example, the testing component 112 might utilize the testing instructions 122 to provide an instruction to the application tester 116 indicating that a particular action should be taken in the application under test 108. When the application tester 116 completes the specified action, another visual or audible prompt might be provided instructing the application tester 116 to perform another operation. In this way, the application developer 104 can define and implement a testing workflow to test various aspects of the operation of the application under test 108. In order to enable this functionality, the testing component 112 might make "hooks" into the application under test 108 in order to determine when the application tester 116 has performed a requested action. Other mechanisms might also be utilized.

The testing component 112 might also provide functionality for enabling communication between the application tester 116 (i.e. the tester computing device 114) and the application developer 104 (i.e. the developer computing device 106) in some configurations. For example, and without limitation, the testing component 112 might be configured to establish a communications session 126 between the tester computing device 114 and the application developer computing device 106. Once the communications session 126 has been established, screen data from the tester computing device 114 (e.g. a screen display generated by the application under test 108) may be transmitted to the application developer computing device 106 where it can be displayed to the application developer 104. In this way, the application developer 104 can view the same on-screen output as the application tester 116.

The application developer 104 might also be able to interact with the view of the screen display of the application under test 108 that is presented at the developer computing device 106 in order to provide further instruction to the application tester 116. For example, and without limitation, the application developer might utilize an appropriate user input device to circle or otherwise annotate a portion of the screen display. In response thereto, instructions may be sent to the testing component 112 to recreate the input made by the developer at the tester computing device 114. In this way, the application developer 104 might be able to annotate a portion of the display screen presented at the tester computing device 114 in order to highlight or otherwise signify a portion of the display screen to the application tester 116.

The testing component 112 might also be configured to utilize the communications session 126 to provide a one or two-way audio or audio/video chat session between the developer computing device 104 and the application tester computing device 114. A one or two-way text chat session might also be established between the developer computing device 106 and the tester computing device 114. The communications session 126 might also be utilized to enable the application developer 104 to provide on-screen annotations on the tester computing device 114, to control the operation of the tester computing device 114, and/or to provide other types of information to the application tester 116 for use in testing the application. One mechanism for allowing the application developer 108 to control the operation of an application 108 executing on the testing computing device 112 is described in U.S. patent application Ser. No. 13/770, 299, entitled "Delegating Video Game Tasks Via a Sharing Service", which was filed on Feb. 19, 2013, and which is expressly incorporated by reference herein in its entirety.

The testing component 112 can also provide functionality for collecting feedback regarding the testing of the application 108 from the application tester 116. For example, and without limitation, the application tester 116 might provide commentary or annotations regarding the various steps performed while testing an application 108. In another configuration, the testing component 112 captures data identifying the operations performed by the application tester 116 during testing of the application 108 and provides the data to the developer computing device 106 via the communications session 126. The data might then be utilized to perform testing on other physical or virtual computing devices. The testing component 112 might also capture and/or receive other types of during the testing of an application 108 and provide the data to a developer computing device 108. Additional details regarding the provision of the testing instructions 122 to instances of the testing component 112, the use of the test instructions during testing of the application under test 108, and for enabling communication between an application developer 104 and an application tester 116 will be provided below with regard to FIG. 4.

Figure 2:
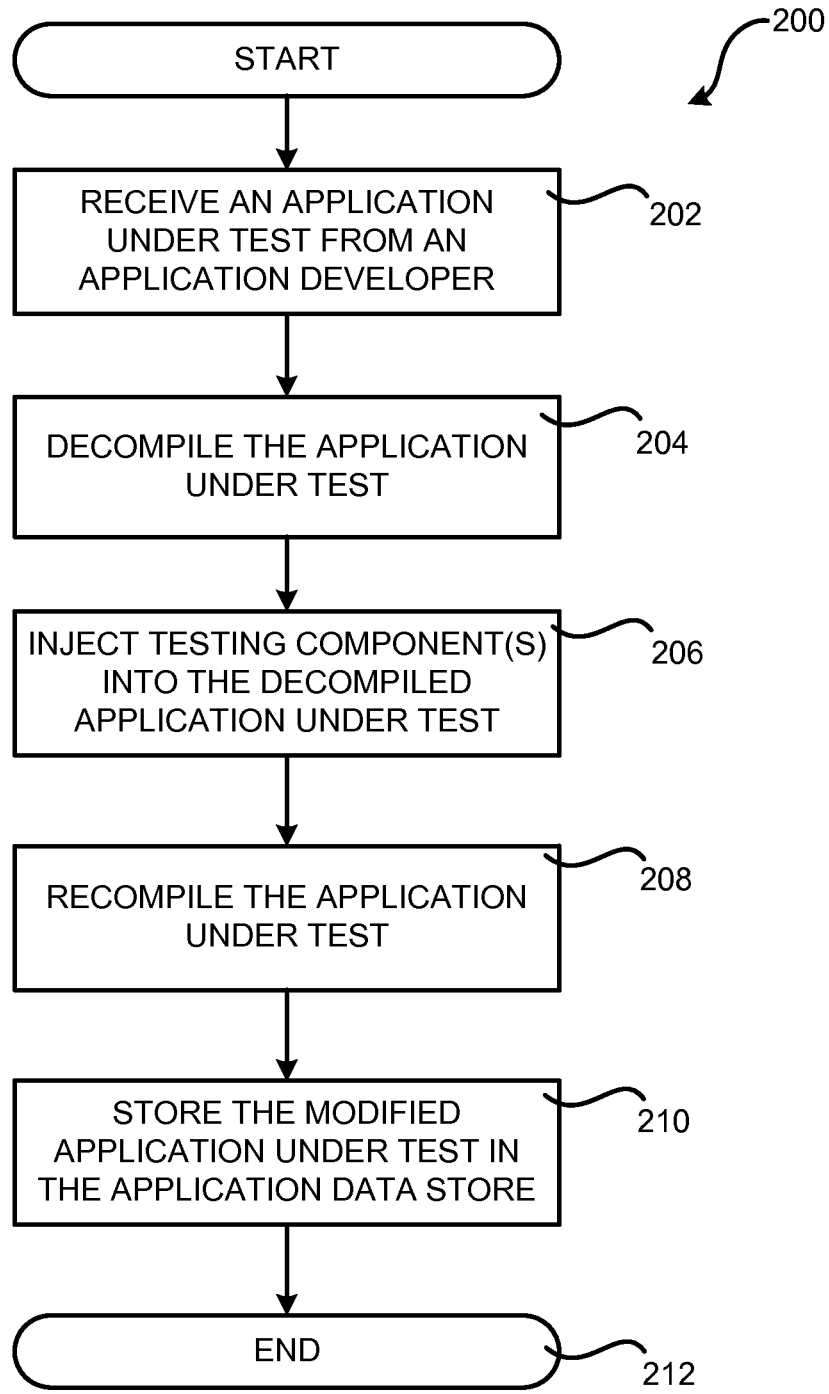
FIG. 2 is a flow diagram illustrating aspects of a routine disclosed herein for modifying an application to include a testing component during ingestion of the application by an application store system.

FIG. 2 is a flow diagram illustrating aspects of a routine 200 disclosed herein for modifying an application under test 108 to include a testing component 112 during ingestion of the application 108 by the application store system 102. It should be appreciated that the logical operations described herein with respect to FIG. 2, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein. Some or all of these operations might also be performed by components other than those specifically identified.

The routine 200 begins at operation 202, where the application ingestion service 110 receives an application under test 108 from a developer computing device 106. In response to receiving the application under test 108, the routine 200 proceeds from operation 202 to operation 204, where the application ingestion service 110 decompiles the application under test 108. For example, and without limitation, the application ingestion service 110 might decompile the application under test 108 to an intermediate language, such as SMALI, in some configurations.

Once the application under test 108 has been decompiled, the routine 200 may proceed to operation 206, where the application ingestion service 110 may inject the testing component 112 into the decompiled version of the application under test. For example, and without limitation, the application ingestion service 110 might instrument the intermediate representation of the application under test 108 with calls to the testing component 112. In particular, the application ingestion service 110 might examine the intermediate code to determine appropriate locations in the intermediate code at which calls to the testing component 112 are to be inserted. Calls to other types of program code for providing digital rights management ("DRM"), for collecting usage data, and for performing other types of functionality might also be inserted into the application under test 108 in a similar fashion.

From operation 206, the routine 200 proceeds to operation 208, where the application ingestion service 110 recompiles the application under test 108 to create a modified version of the application under test 108 that includes the testing component 112. As discussed above, by modifying the application under test 108 in this way, the additional functionality disclosed herein for facilitating the testing of the application 108 and for communicating with the application developer 104 can be provided in conjunction with the execution of the modified application under test 108 on a tester computing device 114. Moreover, because the application ingestion service 110 modifies the application under test 108 to include the testing component 112 in an automated way, the application developer 104 is freed from the tasks of creating the testing component 112 and integrating the testing component 112 with the application under test 108.

From operation 208, the routine 200 proceeds to operation 210, where the application ingestion service 110 may store the modified application under test 108 in the application data store 128. In one configuration the application data store 128 is a network-accessible data store, however, other types of data stores might be utilized in other configurations. As discussed above, the application distribution service 120 may have access to the application data store 128 and obtain the application under test 108 from the application data store 128 for provision to tester computing devices 114. From operation 210, the routine 200 proceeds to operation 212 where it ends.

Figure 3:
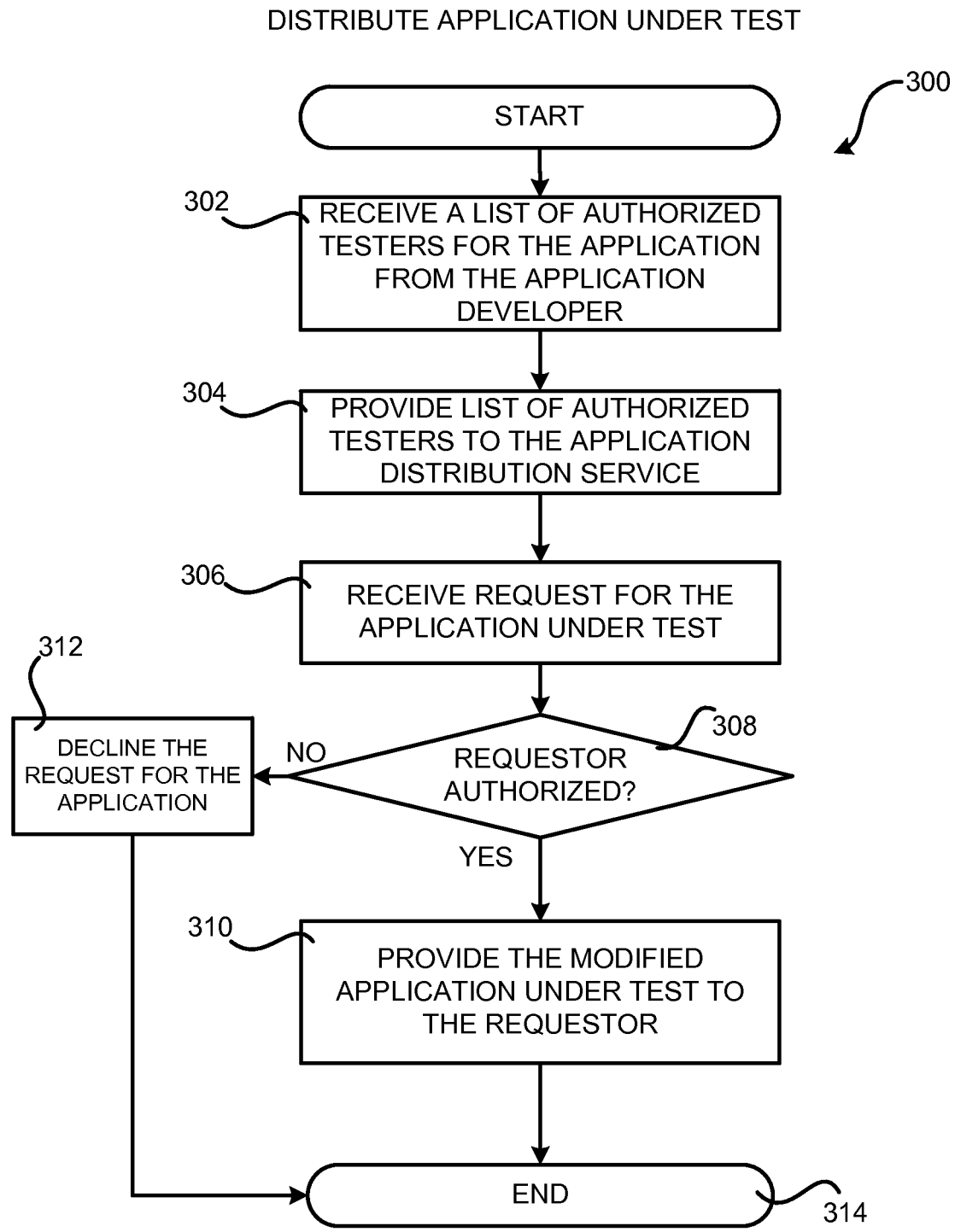
FIG. 3 is a flow diagram illustrating aspects of an illustrative routine disclosed herein for distributing an application under test to one or more authorized application testers.

FIG. 3 is a flow diagram showing aspects of an illustrative routine 300 disclosed herein for distributing an application under test 108 to one or more authorized application testers 116. The routine 300 begins at operation 302, where the application developer console 120 receives the list of application testers 118 from the developer computing device 106. As discussed above, the list of application testers 118 specifies one or more application testers 116 that are authorized to receive the application under test 108 from the application distribution service 120. In response to receiving the list of application testers 1118, the application developer console 120 provides the list of application testers 118 to the application distribution service 120 in one particular configuration.

From operation 304, the routine 300 proceeds to operation 306, where the application distribution service 120 receives a request for the application under test 108 from a tester computing device 114. In response to the request, the application distribution service 120 determines whether the application tester 116 requesting the application under test 108 is authorized to receive the application under test (i.e. is identified in the list of application testers 118). Various services and/or mechanisms may be utilized to authorize and/or authenticate the requesting application tester 116.

If, at operation 308, the application distribution service 120 determines that the application tester 116 requesting the application under test 108 is not authorized to receive the application under test 108, the application distribution service 120 declines the request for the application under test 108 at operation 312. If, however, the application distribution service 120 determines that the application tester 116 requesting the application under test 108 is authorized to receive the application under test 108, the application distribution service 120 provides the application under test 108 to the tester computing device 114 at operation 310. As mentioned above, the application under test 108 provided to the tester computing device 114 has been modified to execute the testing component 112 in the manner described above with regard to FIG. 2. From operation 310, the routine 300 proceeds to operation 314, where it ends.

Figure 4:
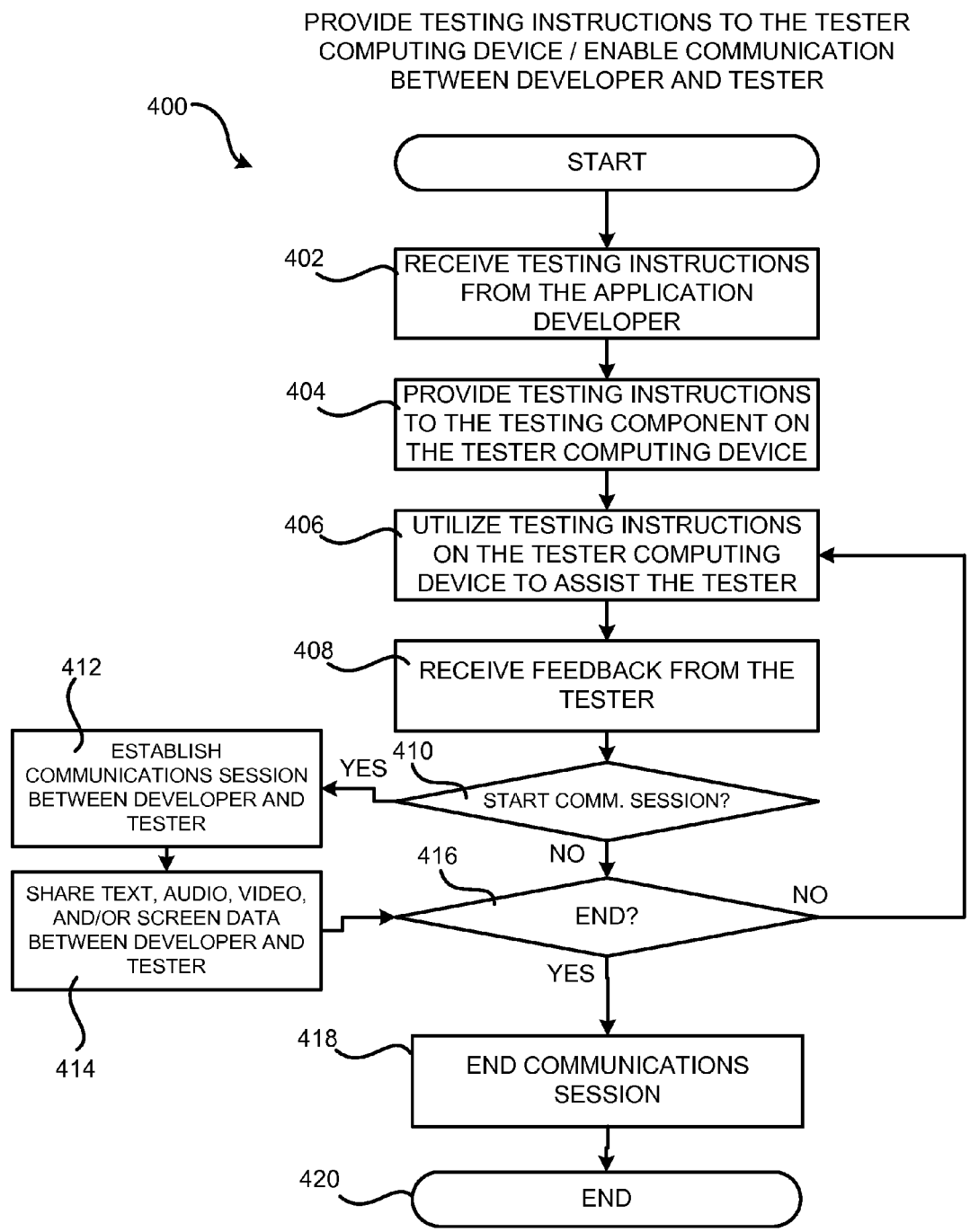
FIG. 4 is a flow diagram illustrating aspects of a routine disclosed herein for providing testing instructions to a testing component for use in testing an application under test, and for facilitating communication between an application tester and an application developer.

FIG. 4 is a flow diagram illustrating aspects of a routine 400 disclosed herein for providing testing instructions 122 to a testing component 112 for use in testing an application under test 108, and for enabling communication between an application tester 116 and an application developer 104. The routine 400 begins at operation 402, where the application developer 104 defines the testing instructions 122 and provides the testing instructions 122 to the application developer console 120 in one configuration.

As discussed above, the testing instructions 122 specify information to be presented to an application tester 116 by the testing component 112 during execution of the application under test 108. The testing instructions 122 might also specify when and how the testing component 122 is to provide the specified information during the execution of the application under test 108. The testing instructions 122 might specify text, graphics, audio, video, and/or other on-screen elements that are to be presented by the testing component 112 to an application tester 116 during execution of the application under test 108 on a tester computing device 114. The testing instructions 122 might also specify on-screen areas that are to be highlighted, emphasized, or annotated in order to facilitate the testing of functionality presented within those areas. A declarative language such as the extensible markup language ("XML") or JAVASCRIPT object notation ("JSON") may be utilized to define the testing instructions 122. Other types of declarative and non-declarative languages and/or data might alternatively be utilized to define the testing instructions 122.

From operation 402, the routine 400 proceeds to operation 404, where the testing instructions 122 are provided to the testing component 112 executing on a tester computing device 114. In one configuration, the communications service 124 is utilized within the application store system 102 to distribute the testing instructions 122 to instances of the testing component 112. Other mechanisms might be utilized in other configurations to provide the testing instructions 122 to an instance of the testing component 112 executing on a tester computing device 114.

From operation 404, the routine 400 proceeds to operation 406, where the testing component 112 utilizes the testing instructions 122 to assist the application tester 116 with the testing of the application under test 108. For example, and without limitation, the testing component 112 might be configured to utilize the testing instructions 122 to display an overlay containing on-screen elements defined by the testing instructions 122 on top of a display provided by the application under test 108. The testing component 112 might also, or alternately, be configured to present modal or non-modal dialog boxes, pop-up notifications, and/or other types of GUI controls in order to present the information defined by the testing instructions 122 to an application tester 116.

As discussed above, the testing instructions 122 might also specify one or more steps or operations to be performed by the application tester 116 in some configurations. For example, the testing component 112 might utilize the testing instructions 122 to provide an audio or visual instruction to the application tester 116 indicating that a particular action should be taken in the application under test 108. When the application tester 116 completes the specified action, another visual or audible prompt might be provided instructing the application tester 116 to perform another operation. In this way, the application developer 104 can define and implement a testing workflow to test various aspects of the operation of the application under test 108.

From operation 406, the routine 400 proceeds to operation 408, where the testing component 112 might receive feedback regarding the testing of the application under test 108 from the application tester 116. For example, and without limitation, the application tester 116 might provide commentary or annotations regarding the various steps performed while testing an application 108 through an interface provided by the testing component 112. In another configuration, the testing component 112 captures data identifying the operations performed by the application tester 116 during testing of the application 108 and provides the data to the developer computing device 106 via the communications session 126. The data might then be utilized to perform testing on other physical or virtual computing devices. The testing component 112 might also capture and/or receive other types of feedback during the testing of an application 108 and provide the data to a developer computing device 108.

From operation 408, the routine 400 proceeds to operation 410, where a determination is made as to whether an application tester 116 has requested to initiate a communications session 126 with an application developer 104. For example, and without limitation, the testing component 112 might present a user interface control which, when selected, will initiate a communications session 126 with the application developer 104. In response to receiving a selection of such a control, the routine 400 proceeds from operation 410 to operation 412, where a communications session 126 is established between the tester computing device 114 and the application developer computing device 106. The communications service 124 might be utilized to establish the communications session 126.

Once the communications session 126 has been established, the routine 400 proceeds from operation 412 to operation 414, where screen data from the tester computing device 114 (e.g. a screen display generated by the application under test 108) may be transmitted to the application developer computing device 106 where it can be displayed to the application developer 104. In this way, the application developer 104 can view the same on-screen output as the application tester 116.

The testing component 112 might also be configured to utilize the communications session 126 to provide a one or two-way audio or audio/video chat session between the developer computing device 104 and the application tester computing device 114 at operation 414. A one or two-way text chat session might also be established between the developer computing device 106 and the tester computing device 114. The communications session 126 might also be utilized to enable the application developer 104 to provide on-screen annotations on the tester computing device 114, to control the operation of the tester computing device 114, and/or to provide other types of information to the application tester 116 for use in testing the application.

From operation 414, the routine 400 proceeds to operation 416 where a determination is made as to whether the application tester 116 has ended the testing of the application under test 108. If the application tester 116 has not ended the testing of the application under test 108, the routine 400 proceeds back to operation 406, where additional testing and/or communication with the application developer 104 might continue in the manner described above. If the user has ended the testing of the application under test 108, the routine 400 proceeds to operation 418, where the communications session 126 is ended. The routine 400 then proceeds to operation 420, where it ends.

It should be appreciated that while the configurations presented herein are primarily described in the context of providing information to an application tester 116 while the application tester 116 is utilizing an application under test 108, other configurations might also be utilized. For example, and without limitation, the testing component 112 might be provided for use in conjunction with an operating system executing on the tester computing device 114 in some configurations. In this way, the functionality described above may be utilized even when the application under test 108 is not executing. In this regard, it should also be appreciated that the use of the technologies disclosed herein is not limited to application testing. For example, and without limitation, these technologies might be utilized by other types of users in other scenarios. For example, the technologies disclosed herein might be utilized in a remote education scenario in order to enable communication between an educator and a student. The technologies disclosed herein might also be utilized in other scenarios not specifically mentioned herein.

It should also be appreciated that although the testing component 112 is integrated into the application under test 108 during ingestion by the application store system 102 in several of the configurations described herein, other configurations are possible. For example, and without limitation, the testing component 112 might be provided to the application tester 104 as a part of a software development kit ("SDK"). The application developer 104 might then utilize the SDK to integrate the functionality described above into the application 108.

Figure 5:
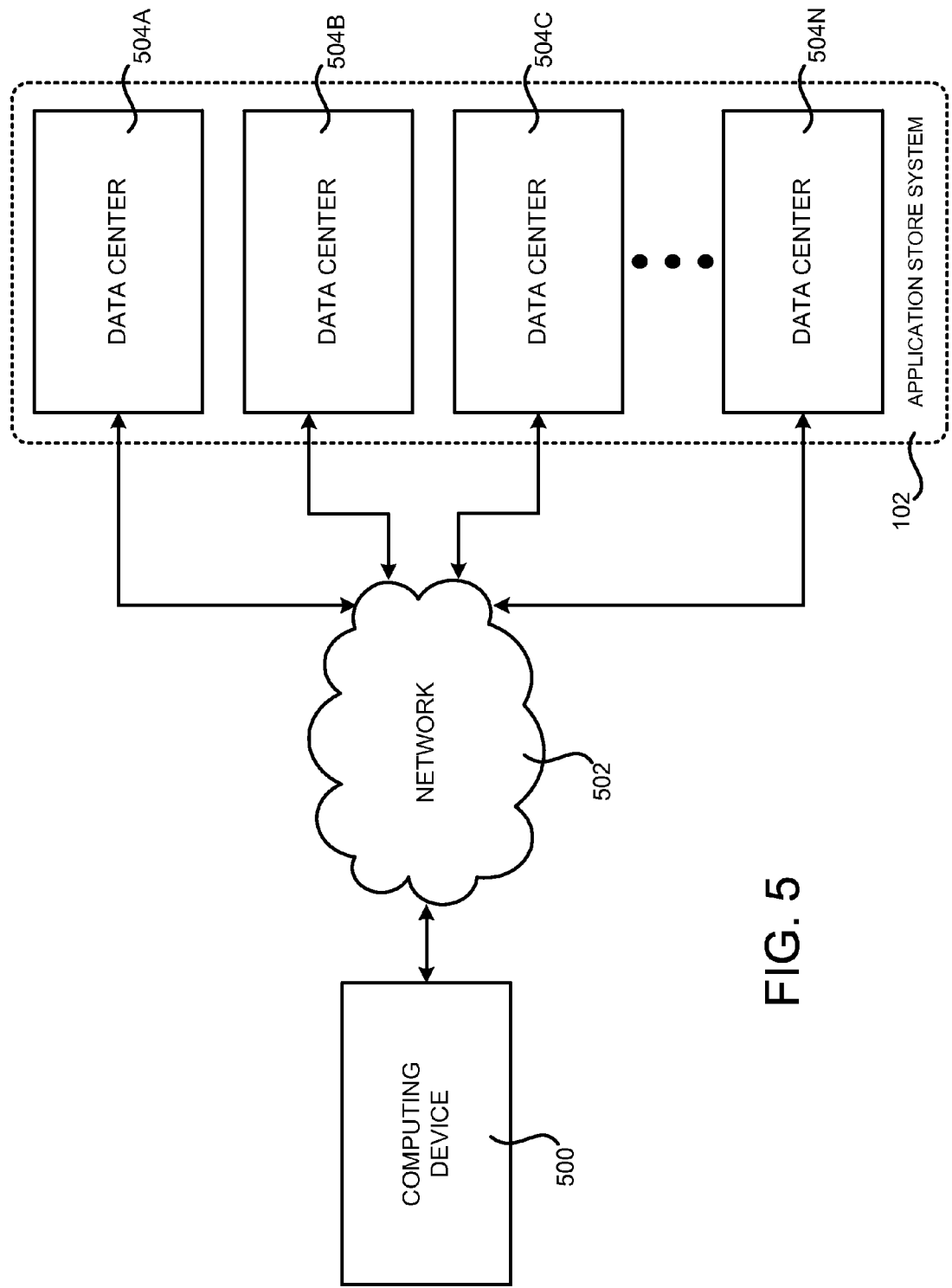
FIG. 5 is a system and network diagram that shows an illustrative operating environment that includes an application store system that may be configured to implement aspects of the functionality described herein.

FIG. 5 is a system and network diagram that shows one illustrative operating environment for the configurations disclosed herein that includes an application store system 102 that may be configured to enable communication between an application developer 104 and an application tester 116, and to facilitate the testing of applications in the manner described above, according to one configuration disclosed herein. The application store system 102 shown in FIG. 5, may be configured to provide various types of computing resources that may be configured and operated in order to provide the functionality disclosed herein.

The computing resources implemented and utilized by the application store system 102 may include various types of computing resources, such as data processing resources, data storage resources, networking resources, data communication resources, network services, and the like. Data processing resources may include physical computers or virtual machine instances in a number of different configurations. The virtual machine instances may be configured to execute applications, including web servers, application servers, media servers, database servers, some or all of the services described above, and/or other types of programs. Data storage resources may include file storage devices, block storage devices, and the like. The application store system 102 might also be configured to provide and utilize other types of resources and/or network services in order to implement the functionality disclosed herein.

The computing resources utilized by the application store system are provided in one implementation by one or more data centers 504A-504N (which may be referred herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 might also be located in geographically disparate locations. One illustrative configuration for a data center 504 that implements some of the technologies disclosed herein for facilitating communication between an application developer 104 and an application tester 116, and for facilitating the testing of applications, will be described below with regard to FIG. 6.

The customers and other users of the application store system 102 may access the functionality provided by the application store system 102 over a network 502, which may be a wide area communication network ("WAN"), such as the Internet, an intranet or an Internet service provider ("ISP") network or a combination of such networks. For example, and without limitation, a computing device 500 operated by a customer or other user of the application store system 102 might be utilized to access the application store system 102 by way of the network 502. It should be appreciated that a local-area network ("LAN"), the Internet, or any other networking topology known in the art that connects the data centers 504 to remote customers and other users may be utilized. It should also be appreciated that combinations of such networks might also be utilized.

Figure 6:
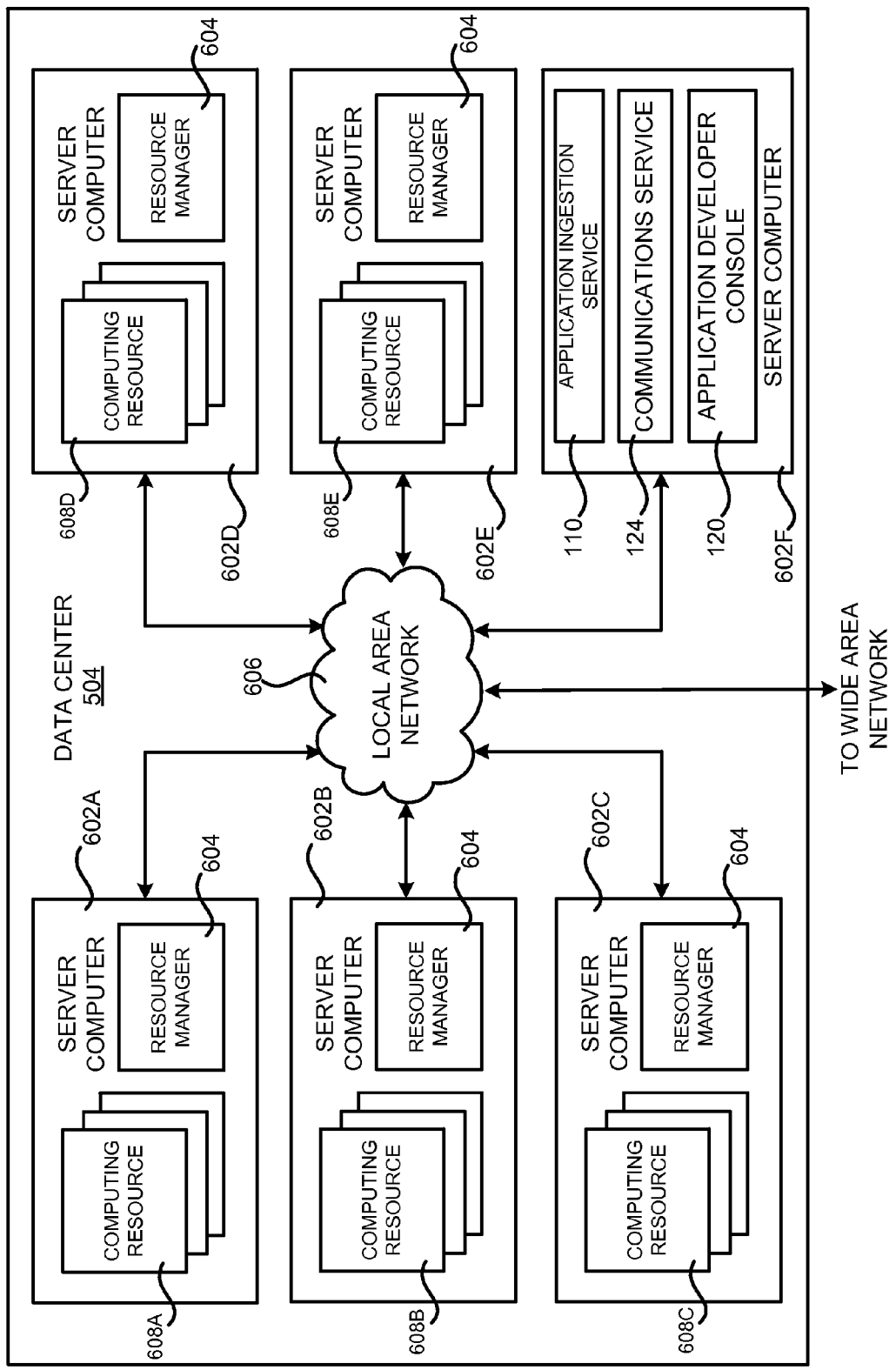
FIG. 6 is a computing system diagram that illustrates a configuration for a data center that may be utilized to implement aspects of the technologies disclosed herein.

FIG. 6 is a computing system diagram that illustrates one configuration for a data center 504 that implements aspects of the concepts and technologies disclosed herein for enabling communication between an application tester 116 and an application developer 104, and for facilitating the testing of applications. The example data center 504 shown in FIG. 6 includes several server computers 602A-602F (which may be referred to herein singularly as "a server computer 602" or in the plural as "the server computers 602") for providing computing resources 608A-608E that implement the functionality disclosed herein.

The server computers 602 may be standard tower, rack-mount, or blade server computers configured appropriately for providing computing resources configured to provide the functionality described above. As mentioned above, the computing resources might be data processing resources such as virtual machine instances or hardware computing systems, data storage resources, database resources, networking resources, and others. Some of the servers 602 might also be configured to execute a resource manager 604 capable of instantiating and/or managing the computing resources. In the case of virtual machine instances, for example, the resource manager 604 might be a hypervisor or another type of program configured to enable the execution of multiple virtual machine instances on a single server 602.

Figure 7:
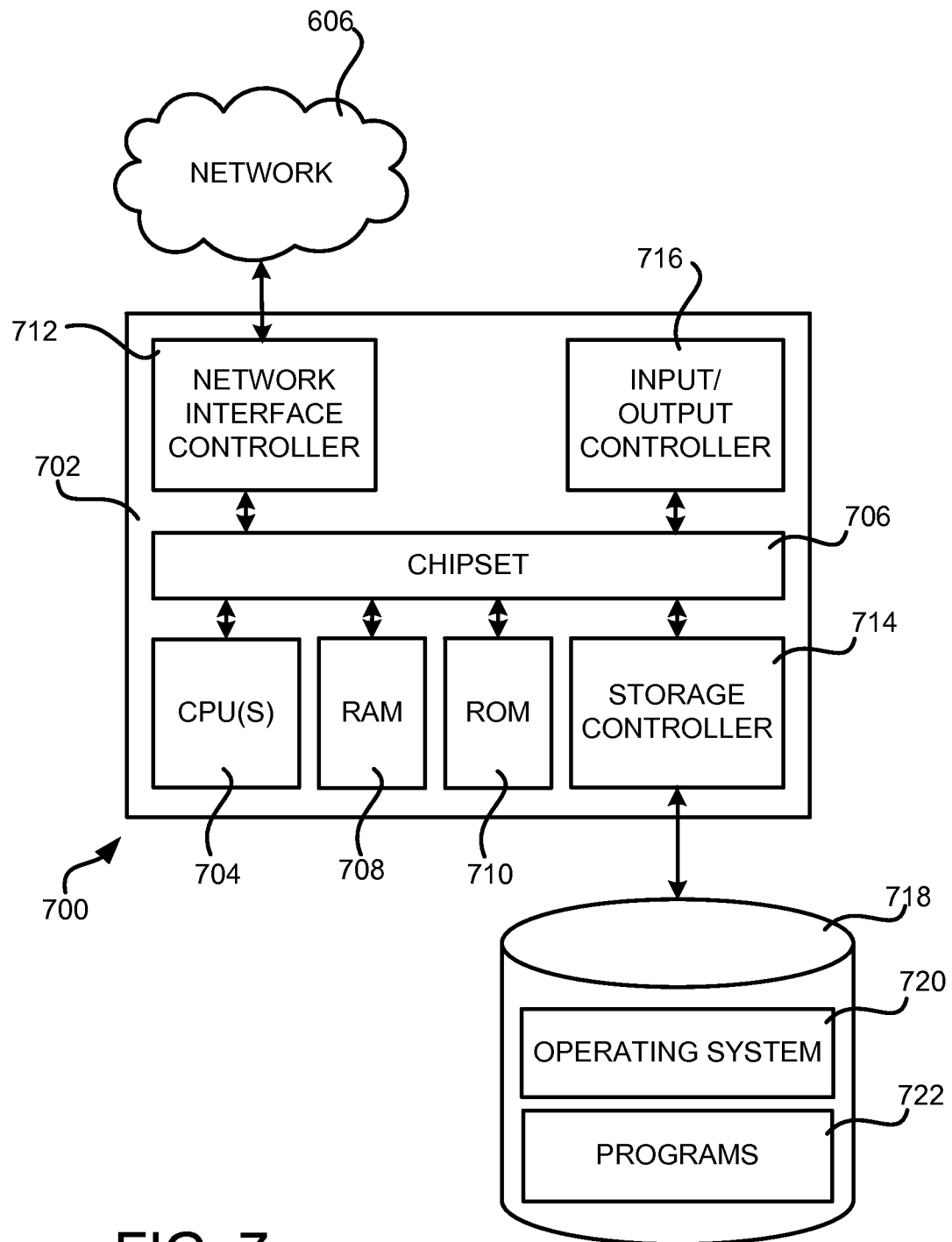
FIG. 7 is a computer architecture diagram showing an illustrative computer hardware architecture for implementing a computing device that might be utilized to implement aspects of the various technologies presented herein.

The data center 504 shown in FIG. 7 also includes a server computer 602F that may execute some or all of the software components described above. For example, and without limitation, the server computer 602F might be configured to execute the application ingestion service 110, the communications service 124, and/or the application developer console 120, software components for providing application store functionality, and/or other types of software components. The server computer 602F might also be configured to execute other components and/or to store data for providing some or all of the functionality described herein. In this regard, it should be appreciated that the program components illustrated in FIG. 6 as executing on the server computer 602F might execute on many other physical or virtual servers in the data centers 504 in various configurations.

In the example data center 504 shown in FIG. 6, an appropriate LAN 606 is also utilized to interconnect the server computers 602A-602F. The LAN 606 is also connected to the network 502 illustrated in FIG. 6. It should be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components might also be utilized for balancing a load between each of the data centers 504A-504N, between each of the server computers 602A-602F in each data center 504, and, potentially, between computing resources in each of the data centers 504. It should be appreciated that the configuration of the data center 504 described with reference to FIG. 6 is merely illustrative and that other implementations might be utilized.

FIG. 7 shows an example computer architecture for a computer 700 capable of executing program components for implementing various aspects of the functionality described above. The computer architecture shown in FIG. 7 illustrates a conventional server computer, workstation, desktop computer, laptop, tablet, network appliance, e-reader, smartphone, or other computing device, and may be utilized to execute any of the software components presented herein. For example, the computer architecture shown in FIG. 7 may be utilized to execute some or all of the software components described above for enabling communication between an application developer 104 and an application tester 116, and for facilitating the testing of an application 108.

The computer 700 includes a baseboard 702, or "motherboard," which is a printed circuit board to which a multitude of components or devices may be connected by way of a system bus or other electrical communication paths. In one illustrative configuration, one or more central processing units ("CPUs") 704 operate in conjunction with a chipset 706. The CPUs 704 may be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 may provide an interface to a RAM 708, used as the main memory in the computer 700. The chipset 706 may further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM may also store other software components necessary for the operation of the computer 700 in accordance with the configurations described herein.

The computer 700 may operate in a networked environment using logical connections to remote computing devices and computer systems through a network, such as the network 606. The chipset 706 may include functionality for providing network connectivity through a NIC 712, such as a gigabit Ethernet adapter. The NIC 712 is capable of connecting the computer 700 to other computing devices over the network 606. It should be appreciated that multiple NICs 712 may be present in the computer 700, connecting the computer to other types of networks and remote computer systems.

The computer 700 may be connected to a mass storage device 718 that provides non-volatile storage for the computer. The mass storage device 718 may store an operating system 720, programs 722, and data, which have been described in greater detail herein. The mass storage device 718 may be connected to the computer 700 through a storage controller 714 connected to the chipset 706. The mass storage device 718 may consist of one or more physical storage units. The storage controller 714 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 may store data on the mass storage device 718 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 718 is characterized as primary or secondary storage, and the like.

For example, the computer 700 may store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the mass storage device 718 by detecting the physical states or characteristics of one or more particular locations within the physical storage units.

In addition to the mass storage device 718 described above, the computer 700 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 700.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 718 may store an operating system 720 utilized to control the operation of the computer 700. According to one configuration, the operating system comprises the LINUX operating system. According to another configuration, the operating system comprises the WINDOWS® SERVER operating system from MICROSOFT Corporation. According to further configurations, the operating system may comprise the UNIX operating system or one of its variants. It should be appreciated that other operating systems may also be utilized. The mass storage device 718 may store other system or application programs and data utilized by the computer 800.

In one configuration, the mass storage device 718 or other computer-readable storage media is encoded with computer-executable instructions which, when loaded into the computer 700, transform the computer from a general-purpose computing system into a special-purpose computer capable of implementing the configurations described herein. These computer-executable instructions transform the computer 700 by specifying how the CPUs 704 transition between states, as described above. According to one configuration, the computer 700 has access to computer-readable storage media storing computer-executable instructions which, when executed by the computer 700, perform the various processes described above with regard to FIGS. 1-4. The computer 700 might also include computer-readable storage media for performing any of the other computer-implemented operations described herein.

The computer 700 may also include one or more input/output controllers 716 for receiving and processing input from a number of input devices, such as a keyboard, a mouse, a touchpad, a touch screen, an electronic stylus, or other type of input device. Similarly, an input/output controller 716 may provide output to a display, such as a computer monitor, a flat-panel display, a digital projector, a printer, a plotter, or other type of output device. It will be appreciated that the computer 700 may not include all of the components shown in FIG. 7, may include other components that are not explicitly shown in FIG. 7, or may utilize an architecture completely different than that shown in FIG. 7.

Based on the foregoing, it should be appreciated that technologies for enabling communication between an application developer 104 and an application tester 116, and for facilitating the testing of an application 108 have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. An apparatus for facilitating the testing of an application under test, the apparatus comprising:
   a processor; and
   a non-transitory computer-readable storage medium having instructions stored thereupon which are executable by the processor and which, when executed, cause the apparatus to
   receive the application under test from a first computing device associated with an application developer,
   create a modified version of the application under test that includes a testing component configured to utilize testing instructions defined by the application developer during execution of the application under test on a second computing device associated with an authorized application tester, and
   provide the modified application under test to the second computing device, whereby the testing component is configured to execute in conjunction with the application under test on the second computing device and to utilize the testing instructions to present information to the authorized application tester for use by the authorized application tester in testing execution of the application under test, and whereby the testing component is further configured to establish a communications session between the first computing device associated with the application developer and the second computing device associated with the authorized application tester and to transmit screen data generated by the second computing device to the first computing device via the communication session.

2. The apparatus of claim 1, wherein the testing instructions further define a sequence of steps to be performed by the authorized application tester in testing execution of the application under test.

3. The apparatus of claim 1, wherein the testing instructions further define one or more on-screen elements to be presented to the authorized application tester by the second computing device.

4. The apparatus of claim 1, wherein the testing component is further configured to transmit video generated by the first computing device to the second computing device and to receive video generated by the second computing device via the communications session.

5. The apparatus of claim 1, wherein the testing component is further configured to establish a two-way chat session between the first computing device and the second computing device via the communications session.

6. A non-transitory computer-readable storage medium having computer-executable instructions stored thereupon which, when executed by a computing device, cause the computing device to:
receive testing instructions defined by a developer of an application under test at the computing device, the testing instructions defining information to be presented during execution of the application under test on the computing device for use by an authorized application tester in testing execution of the application under test; and
execute a testing component on the computing device in conjunction with the execution of the application under test, the testing component configured to utilize the testing instructions to present the information to the authorized application tester, the testing component configured to establish a communications session between the computing device and a second computing device associated with the application developer and to transmit screen data generated by the computing device to the second computing device via the communication session, and wherein the application under test is modified by an application store ingestion process to include the testing component.

7. The non-transitory computer-readable storage medium of claim 6, wherein the testing instructions further define a sequence of operations to be performed by the authorized application tester in testing execution of the application under test.

8. The non-transitory computer-readable storage medium of claim 6, wherein the information is presented to the authorized application tester by way of an overlay containing on-screen elements defined by the testing instructions on top of a display provided by the application under test.

9. The non-transitory computer-readable storage medium of claim 6, wherein the testing component is further configured to collect feedback from the authorized application tester and to provide the feedback to a second computing device associated with the application developer.

10. The non-transitory computer-readable storage medium of claim 6, wherein the testing component is further configured to receive instructions from the second computing device for controlling the operation of the application under test on the computing device via the communications session.

11. A computer-implemented method for enabling communication between an application developer and an application user, comprising:
receiving an application;
generating a modified version of the application that includes a software component configured to facilitate communication between the application developer and an authorized application user; and
providing the modified application to a computing device associated with the authorized application user, whereby the software component is configured to execute on the computing device in conjunction with execution of the application and to receive instructions defined by the application developer and to utilize the instructions to present information to the authorized application user during execution of the application, and whereby the software component is further configured to enable communication between the computing device and a second computing device associated with the application developer via a communications session, and to transmit screen data generated by the computing device to the second computing device via the communication session.

12. The computer-implemented method of claim 11, wherein the instructions further define a sequence of operations to be performed by the authorized application user.

13. The computer-implemented method of claim 11, wherein the software component is further configured to transmit video generated by the computing device to the second computing device and to receive video generated by the second computing device via the communications session.

14. The computer-implemented method of claim 11, wherein the software component is further configured to establish a two-way chat session between the computing device and the second computing device via the communications session.

15. The apparatus of claim 1, wherein the testing component is further configured to collect feedback from the authorized application tester and to provide the feedback to the first computing device associated with the application developer.

16. The non-transitory computer-readable storage medium of claim 6, wherein the testing component is further configured to establish a two-way chat session between the computing device and the second computing device via the communications session.

17. The non-transitory computer-readable storage medium of claim 6, wherein the testing component is further configured to transmit video generated by the computing device to the second computing device and to receive video generated by the second computing device via the communications session.

18. The computer-implemented method of claim 11, wherein the instructions further define one or more on-screen elements to be presented to the authorized application user by the computing device.

19. The computer-implemented method of claim 18, wherein the one or more on-screen elements is presented to the authorized application user by way of an overlay containing the one or more on-screen elements on top of a display provided by the application.

20. The computer-implemented method of claim 11, wherein the testing component is further configured to collect feedback from the authorized application user and to provide the feedback to the second computing device associated with the application developer.

* * * * *